US 6,343,072 B1

(12) United States Patent
Bechtolsheim et al.

(10) Patent No.: US 6,343,072 B1
(45) Date of Patent: *Jan. 29, 2002

(54) SINGLE-CHIP ARCHITECTURE FOR SHARED-MEMORY ROUTER

(75) Inventors: Andreas V. Bechtolsheim, Stanford; David R. Cheriton, Palo Alto, both of CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,122

(22) Filed: Dec. 31, 1997

Related U.S. Application Data

(60) Provisional application No. 60/060,628, filed on Oct. 1, 1997.

(51) Int. Cl.$^7$ ................................. H04L 12/46
(52) U.S. Cl. ................ 370/351; 370/366; 370/412; 709/240
(58) Field of Search ................... 370/229, 230, 370/235, 236, 237, 252, 254, 400, 401, 402, 466, 389, 392, 351, 412, 413, 414, 415, 416, 366; 711/216; 709/240, 242, 244

(56) References Cited

U.S. PATENT DOCUMENTS

| 4,131,767 A | 12/1978 | Weinstein |
| 4,161,719 A | 7/1979 | Parikh et al. |
| 4,316,284 A | 2/1982 | Howson |
| 4,397,020 A | 8/1983 | Howson |

(List continued on next page.)

FOREIGN PATENT DOCUMENTS

| EP | 0 384 758 A2 | 8/1990 | ........... H04L/12/56 |
| EP | 0 431 751 A1 | 6/1991 | ........... H04L/12/46 |
| EP | 0 567 217 A2 | 10/1993 | ........... H04L/12/46 |

(List continued on next page.)

OTHER PUBLICATIONS

Shyamal Chowdhury and Kazem Sohraby, "*Alternative Bandwidth Allocation Algorithms ForPacket Video In ATM Networks,*" Infocom 1992, IEEE, pp. 1061–1068.
William Stallings Ph.D., "*Data and Computer Communications,*" Macmillan Publishing Company and Collier Macmillan Publishers 1985, pp. 328–334.

(List continued on next page.)

*Primary Examiner*—Wellington Chin
*Assistant Examiner*—Frank Duong
(74) *Attorney, Agent, or Firm*—Skjerven Morrill MacPherson, LLP

(57) ABSTRACT

The invention provides a single-chip method. The method includes a memory shared among packet buffers for receiving packets, packet buffers for transmitting packets, and packet header buffers for packet forwarding lookup. Accesses to that shared memory are multiplexed and prioritized. Packet reception is performed with relatively high priority, packet transmission is performed with medium priority, and packet forwarding lookup is performed with relatively low priority. The single-chip method includes circuits for serially receiving packet header information, converting that information into a parallel format for transmission to an SRAM for lookup, and queuing input packets for later forwarding at an output port. Similarly, the single-chip method includes circuits for queuing output packets for transmission at an output port, receiving packet forwarding information from the SRAM in a parallel format, and converting packet header information from output packets into a serial format for transmission. The single-chip method also includes a region in its shared memory for a packet forwarding table, and circuits for performing forwarding lookup responsive to packet header information.

23 Claims, 2 Drawing Sheets

U.S. PATENT DOCUMENTS

| | | |
|---|---|---|
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |
| 4,445,213 A | 4/1984 | Baugh et al. |
| 4,446,555 A | 5/1984 | Devault et al. |
| 4,456,957 A | 6/1984 | Schieltz |
| 4,464,658 A | 8/1984 | Thelen |
| 4,499,576 A | 2/1985 | Fraser |
| 4,506,358 A | 3/1985 | Montgomery |
| 4,507,760 A | 3/1985 | Fraser |
| 4,532,626 A | 7/1985 | Flores et al. |
| 4,644,532 A | 2/1987 | George et al. |
| 4,646,287 A | 2/1987 | Larson et al. |
| 4,677,423 A | 6/1987 | Benvenuto et al. |
| 4,679,189 A | 7/1987 | Olson et al. |
| 4,679,227 A | 7/1987 | Hughes-Hartogs |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckberg, Jr. et al. |
| 4,769,811 A | 9/1988 | Eckberg, Jr. et al. |
| 4,771,425 A | 9/1988 | Baran et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,306 A | 1/1990 | Chao et al. |
| 4,903,261 A | 2/1990 | Baran et al. |
| 4,922,486 A | 5/1990 | Lidinsky et al. |
| 4,933,937 A | 6/1990 | Konishi |
| 4,960,310 A | 10/1990 | Cushing |
| 4,962,497 A | 10/1990 | Ferenc et al. |
| 4,962,532 A | 10/1990 | Kasirai et al. |
| 4,965,767 A | 10/1990 | Kinoshita et al. .............. 365/49 |
| 4,965,772 A | 10/1990 | Daniel et al. |
| 4,970,678 A | 11/1990 | Sladowski et al. |
| 4,979,118 A | 12/1990 | Kheradpir ................... 364/436 |
| 4,980,897 A | 12/1990 | Decker et al. |
| 4,991,169 A | 2/1991 | Davis et al. |
| 5,003,595 A | 3/1991 | Collins et al. |
| 5,014,265 A | 5/1991 | Hahne et al. |
| 5,020,058 A | 5/1991 | Holden et al. |
| 5,033,076 A | 7/1991 | Jones et al. |
| 5,034,919 A | 7/1991 | Sasai et al. .................... 365/49 |
| 5,054,034 A | 10/1991 | Hughes-Hartogs |
| 5,059,925 A | 10/1991 | Weisbloom |
| 5,072,449 A | 12/1991 | Enns et al. |
| 5,088,032 A | 2/1992 | Bosack |
| 5,095,480 A | 3/1992 | Fenner |
| RE33,900 E | 4/1992 | Howson |
| 5,115,431 A | 5/1992 | Williams et al. |
| 5,128,945 A | 7/1992 | Enns et al. |
| 5,136,580 A | 8/1992 | Videlock et al. |
| 5,166,930 A | 11/1992 | Braff et al. |
| 5,199,049 A | 3/1993 | Wilson |
| 5,206,886 A | 4/1993 | Bingham |
| 5,208,811 A | 5/1993 | Kashio et al. |
| 5,212,686 A | 5/1993 | Joy et al. |
| 5,224,099 A | 6/1993 | Corbalis et al. |
| 5,226,120 A | 7/1993 | Brown et al. |
| 5,228,062 A | 7/1993 | Bingham |
| 5,229,994 A | 7/1993 | Balzano et al. |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,247,516 A | 9/1993 | Bernstein et al. |
| 5,249,178 A | 9/1993 | Kurano et al. |
| 5,253,251 A | 10/1993 | Aramaki |
| 5,255,291 A | 10/1993 | Holden et al. |
| 5,260,933 A | 11/1993 | Rouse |
| 5,260,978 A | 11/1993 | Fleischer et al. |
| 5,268,592 A | 12/1993 | Bellamy et al. |
| 5,268,900 A | 12/1993 | Hluchyj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,291,482 A | 3/1994 | McHarg et al. |
| 5,305,311 A | 4/1994 | Lyles |
| 5,307,343 A | 4/1994 | Bostica et al. |
| 5,309,437 A | 5/1994 | Perlman et al. .......... 730/85.13 |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,327,421 A | 7/1994 | Hiller et al. |
| 5,331,637 A | 7/1994 | Francis et al. |
| 5,345,445 A | 9/1994 | Hiller et al. |
| 5,345,446 A | 9/1994 | Hiller et al. |
| 5,359,592 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,386,567 A | 1/1995 | Lien et al. |
| 5,390,170 A | 2/1995 | Sawant et al. |
| 5,390,175 A | 2/1995 | Hiller et al. |
| 5,394,394 A | 2/1995 | Crowther et al. |
| 5,394,402 A | 2/1995 | Ross |
| 5,400,325 A | 3/1995 | Chatwani et al. |
| 5,408,469 A | 4/1995 | Opher et al. |
| 5,416,842 A | 5/1995 | Aziz |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,428,607 A | 6/1995 | Hiller et al. |
| 5,430,715 A | 7/1995 | Corbalis et al. |
| 5,430,729 A | 7/1995 | Rahnema |
| 5,442,457 A | 8/1995 | Najafi |
| 5,442,630 A | 8/1995 | Gagliardi et al. |
| 5,452,297 A | 9/1995 | Hiller et al. |
| 5,473,599 A | 12/1995 | Li et al. |
| 5,473,607 A | 12/1995 | Hausman et al. |
| 5,477,541 A | 12/1995 | White et al. |
| 5,485,455 A | 1/1996 | Dobbins et al. |
| 5,490,140 A | 2/1996 | Abensour et al. |
| 5,490,258 A | 2/1996 | Fenner |
| 5,491,687 A | 2/1996 | Christensen et al. |
| 5,491,804 A | 2/1996 | Heath et al. |
| 5,497,368 A | 3/1996 | Reijnierse et al. |
| 5,504,747 A | 4/1996 | Sweasey |
| 5,509,006 A | 4/1996 | Wilford et al. |
| 5,517,494 A | 5/1996 | Green |

| | | |
|---|---|---|
| 5,519,704 A | 5/1996 | Farinacci et al. |
| 5,519,858 A | 5/1996 | Walton et al. ............... 395/600 |
| 5,526,489 A | 6/1996 | Nilakantan et al. |
| 5,530,963 A | 6/1996 | Moore et al. |
| 5,535,195 A | 7/1996 | Lee |
| 5,539,734 A | 7/1996 | Burwell et al. |
| 5,541,911 A | 7/1996 | Nilakantan et al. |
| 5,555,244 A | 9/1996 | Gupta et al. |
| 5,561,669 A | 10/1996 | Lenney et al. |
| 5,583,862 A | 12/1996 | Callon |
| 5,592,470 A | 1/1997 | Rudrapatna et al. |
| 5,598,581 A | 1/1997 | Daines et al. |
| 5,600,798 A | 2/1997 | Cherukuri et al. |
| 5,602,770 A | 2/1997 | Ohira ........................... 365/49 |
| 5,604,868 A | 2/1997 | Komine et al. |
| 5,608,726 A | 3/1997 | Virgile |
| 5,617,417 A | 4/1997 | Sathe et al. |
| 5,617,421 A | 4/1997 | Chin et al. |
| 5,630,125 A | 5/1997 | Zellweger |
| 5,631,908 A | 5/1997 | Saxe |
| 5,632,021 A | 5/1997 | Jennings et al. |
| 5,633,865 A * | 5/1997 | Short ......................... 370/412 |
| 5,634,010 A | 5/1997 | Ciscon et al. |
| 5,638,359 A | 6/1997 | Peltola et al. |
| 5,640,399 A * | 6/1997 | Rostoker et al. ............ 370/392 |
| 5,644,718 A | 7/1997 | Belove et al. |
| 5,659,684 A | 8/1997 | Giovannoni et al. |
| 5,666,353 A | 9/1997 | Klausmeier et al. |
| 5,673,265 A | 9/1997 | Gupta et al. |
| 5,678,006 A | 10/1997 | Valizadeh et al. |
| 5,680,116 A | 10/1997 | Hashimoto et al. |
| 5,684,797 A | 11/1997 | Aznar et al. |
| 5,687,324 A | 11/1997 | Green et al. |
| 5,689,506 A | 11/1997 | Chiussi et al. |
| 5,694,390 A | 12/1997 | Yamato et al. |
| 5,724,351 A | 3/1998 | Chao et al. |
| 5,740,097 A | 4/1998 | Satoh ........................... 365/49 |
| 5,748,186 A | 5/1998 | Raman |
| 5,748,617 A | 5/1998 | McLain, Jr. |
| 5,754,547 A | 5/1998 | Nakazawa |
| 5,802,054 A | 9/1998 | Bellenger |
| 5,835,710 A | 11/1998 | Nagami et al. |
| 5,841,874 A | 11/1998 | Kempke et al. ............ 713/160 |
| 5,854,903 A | 12/1998 | Morrison et al. |
| 5,856,981 A | 1/1999 | Voelker |
| 5,862,338 A * | 1/1999 | Walker et al. ............... 370/392 |
| 5,892,924 A | 4/1999 | Lyon et al. ............ 395/200.75 |
| 5,898,686 A | 4/1999 | Virgile |
| 5,903,559 A | 5/1999 | Acharya et al. |
| 5,923,654 A * | 7/1999 | Schnell ....................... 370/390 |
| 5,949,786 A * | 9/1999 | Bellenger ................... 370/401 |

FOREIGN PATENT DOCUMENTS

| | | | |
|---|---|---|---|
| WO | WO93/07569 | 4/1993 | |
| WO | WO 93/07569 | 4/1993 | ........... G06F/13/40 |
| WO | WO 93/07692 | 4/1993 | ............ H04J/3/24 |
| WO | WO93/07692 | 4/1993 | |
| WO | WO94/01828 | 1/1994 | |
| WO | WO 94/01828 | 1/1994 | ............ G06F/5/00 |
| WO | WO 95/20850 | 8/1995 | ........... H04L/12/56 |
| WO | WO95/50850 | 8/1995 | |

OTHER PUBLICATIONS

William Stallings, Ph.D., "Data and Computer Communications," second edition, Macmillan Publishing Company, New York, and Collier Macmillan Publishers, London, pp. 328–334.

William Stallings, Ph.D., "Data and Computer Communications," fourth edition, Macmillan Publishing Company, New York, Maxwell Macmillan Canada, Toronto, and Maxwell Macmillan International, pp. 328–334.

Donald Becker, "3c589.c EtherLink3 Ethernet Driver for Linux," 1994.

Hiroshi Edaki, Yoshiyuki Tsuda, Takeshi Saito, and Shigeyasu Natsubori, "Datagram Delivery In An ATM–Internet," IEICE Trans. Communication, vol. E77–B, No. 3, Mar. 1994.

IBM© Technical Disclosure Bulletin, vol. 35, No. 6, IBM Corporation, Nov. 1992.

IBM© Technical Disclosure Bulletin, "Method and Apparatus For The Statisical Multiplexing of Voice, Data, and Image Signals," vol. 35, No. 6, IBM Corporation, Nov. 1992.

Tong–Bi Pei and Charles Zukowski, "Putting Routing Tables In Silicon," IEEE Network, Jan. 1992, vol. 6, No. 1, pp. 42–50.

M. Allen, "Novell IPX Over Various Wan Media (IPX-WAN)," Novell, Inc. Dec. 1993, pp. 1–20.

W. Simpson, "The Point–to–Point Protocol (PPP)," Daydreamer, Dec. 1993, pp. 1–47.

H. Zhang and D. Ferrai, "Rate–Controlled Static–Priority Queuing," Computer Science Division, University of Berkely, IEEE Network, Mar. 1993, pp. 227–235.

D. Perkins, "Requirements For An Internet Standard Point –to–Point Protocol," Carnegie Mellon University, Dec. 1993.

W. Boeringer, G. Karjoth and M. Nassehi, "Routing on Longest–Matching Prefixes," IEEE/ACM Transactions on Networking, vol. 4, No. 1, Feb. 1996, pp. 86–97.

Paul F. Tsuchiya, "A Search Algorithm For Table Entries With Non–Contiguous Wildcarding," pp. 1–10.

Allen, M., "Novell IPX Over Various WAN Media (IPXW AN)," Network Working Group, RFC 1551, Dec. 1993, pp. 1–22.

Becker, D., "3c589.c: A 3c589 EtherLink3 ethernet driver for linux," becker@CESDIS.gsfc.nasa.gov, May 3, 1994, pp. 1–13.

Chowdhury, et al., "Alternative Bandwidth Allocation Algorithms for Packet Video in ATM Networks," INFOCOM 1992, pp. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point –to–Point Protocol," Network Working Group, RFC 1547, Dec. 1993, pp. 1–19.

Simpson, W., "The Point–to–Point Protocol (PPP)," Network Working Group, RFC 1548, Dec. 1993, pp. 1–53.

Tsuchiya, P.F., "A Search Algorithm for Table Entries with Non–Contiguous Wildcarding," Abstract, Bellcore.

Zhang, et al., "Rate–Controlled Static–Priority Queueing," INFOCOM 1993, pp. 227–236.

William Stallings, Data and Computer Communications, PP: 329–333, Prentice Hall, Upper Saddle River, New Jersey 07458.

* cited by examiner

SINGLE-CHIP ARCHITECTURE FOR SHARED-MEMORY ROUTER

This application claims priority of Provisional Application No. 60/060,628, filed on Oct. 1, 1997 hereby incorporated by reference as if fully set forth herein.

BACKGROUND OF THE INVENTION

1. Field of the Invention

This invention relates to a single-chip architecture for a shared-memory router.

2. Related Art

In a packet-switched network, a "router" is a device which receives packets on one or more input interfaces and which outputs those packets on one of a plurality of output interfaces, so as to move those packets within the network from a source device to a destination device. Each packet includes header information which indicates the destination device (and other information), and the router includes routing information which associates an output interface with information about the destination device (possibly with other information). The router can also perform other operations on packets, such as rewriting the packets' headers according to their routing protocol or to reencapsulate the packets from a first routing protocol to a second routing protocol.

It is advantageous for routers to operate as quickly as possible, so that as many packets as possible can be switched in a unit time. Because routers are nearly ubiquitous in packet-switched networks, it is also advantageous for routers to occupy as little space as possible and to be easily integrated into a networking system. For example, implementing a router on a single chip (that is, a single integrated circuit) would be particularly advantageous.

In this regard, one problem which has arisen in the art is that individual integrated circuits and their packages are relatively limited in resources needed to implement a router. In particular, individual chips have only a relatively limited number of pins, a relatively limited die area, and a relatively limited amount of power available for operation. These limitations severely limit the possibility of providing a useful router on a single chip. Routing devices generally need relatively more input and output ports (thus requiring relatively more pins), relatively more lookup table space (thus requiring relatively larger die size for memory), relatively more packet buffering space (thus requiring relatively larger die size for memory), and relatively more packets routed in unit time (thus requiring relatively larger die size for processing ability and relatively larger power dissipation for speed).

Accordingly, it would be advantageous to provide a single-chip router. This advantage is achieved in an embodiment of the invention in which a router integrated on a single chip shares memory among packet buffers for receiving packets, packet buffers for transmitting packets, and packet header buffers for packet forwarding lookup, and in which accesses to that shared memory are multiplexed and prioritized to maximize throughput and minimize routing latency.

SUMMARY OF THE INVENTION

The invention provides a single-chip router. The router includes a memory shared among packet buffers for receiving packets, packet buffers for transmitting packets, and packet header buffers for packet forwarding lookup. Accesses to that shared memory are multiplexed and prioritized. Packet reception is performed with relatively high priority, packet transmission is performed with medium priority, and packet forwarding lookup is performed with relatively low priority.

In a preferred embodiment, the single-chip router includes circuits for serially receiving packet header information, converting that information into a parallel format for transmission to an SRAM for lookup, and queuing input packets for later forwarding at an output port. Similarly, in a preferred embodiment, the single-chip router includes circuits for queuing output packets for transmission at an output port, receiving packet forwarding information from the SRAM in a parallel format, and converting packet header information from output packets into a serial format for transmission. The single-chip router also includes a region in its shared memory for a packet forwarding table, and circuits for performing forwarding lookup responsive to packet header information.

DETAILED DESCRIPTION OF THE PREFERRED EMBODIMENTS

In the following description, a preferred embodiment of the invention is described with regard to preferred process steps and data structures. Those skilled in the art would recognize after perusal of this application that embodiments of the invention can be implemented using circuits adapted to particular process steps and data structures described herein, and that implementation of the process steps and data structures described herein would not require undue experimentation or further invention.

System Elements

Figure 1:
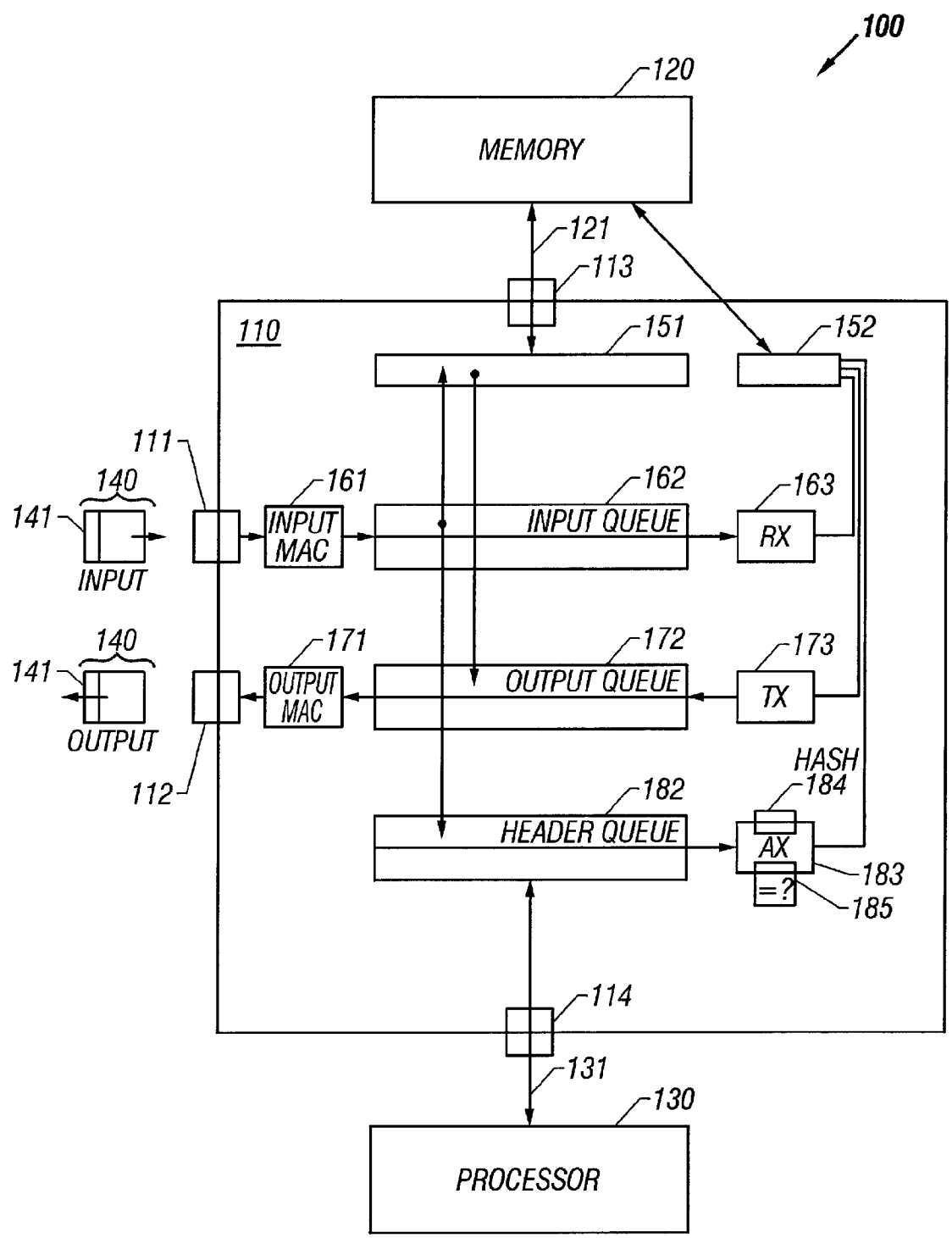
FIG. 1 shows a block diagram of a system including a single-chip router.

FIG. 1 shows a block diagram of a system including a single-chip router.

A system 100 includes a single-chip router 110, a memory 120 coupled to the router 110 using a memory bus 121, and a processor 130 coupled to the router 110 using a processor bus 131.

The router 110 includes a plurality of input ports 111, a plurality of output ports 112, a memory port 113 coupled to the memory bus 121, a processor port 114 coupled to the processor bus 131, and a set of internal memory and internal processing circuits integrated into a single monolithic integrated circuit on at least one side of a silicon die.

In a preferred embodiment, the memory 120 includes an SRAM, and the memory bus 121 includes a 256 bit wide bus operating at about 125 megahertz, so as to provide 32 gigabits per second full duplex communication (that is, both to and from the memory 120). The memory 120 includes sufficient storage to record a set of packets 140 which are received from the input ports 111 and which are in transit to the output ports 112.

The memory port 113 includes a memory data register 151 having 64 eight-bit bytes disposed in a set of four groups of 16 eight-bit bytes, and disposed for receiving data from selected registers of the memory 120 (such as in memory read operations) and for transmitting data to selected registers of the memory 120 (such as in memory write operations). The memory port 113 also includes a memory address register 152 for selecting the registers of the memory 120 to be read or written.

Packet Receive Circuits

Each one of the input ports 111 is coupled to an input MAC circuit 161, for receiving a set of packets 140 from the input port 111, recognizing a MAC address of the sending device, recognizing a MAC address of the router 110 (as the receiving device), and coupling the packets 140 to an input packet queue 162. In a preferred embodiment, the input MAC circuit 161 receives the packets 140 in a bit serial format and outputs them to the input packet queue 162 as a sequence of eight-bit bytes.

The input packet queue 162 includes a shift register, for receiving the sequence of eight-bit bytes in serial from the input MAC circuit 161, and for transmitting a set of 256 bits (that is, 64 eight-bit bytes) in parallel to the memory data register 151. In a preferred embodiment, the input packet queue 162 is double-buffered; that is, it includes two separate shift registers, one of which can be reading packets 140 in serial from the input MAC circuit 161 while the other can be writing packets 140 in parallel to the memory data register 151.

The input packet queue 162 is coupled to a receive request circuit 163, for determining that the packet 140 has been received (or partially received, if more than 256 bits in length), and for signaling the memory 120 to read the packet 140 from the input packet queue 162. The receive request circuit 163 is coupled to the memory address register 152 and to a control signal for the memory 120.

Packet Transmit Circuits

Similar to the input ports 111, each one of the output ports 112 is coupled to an output MAC circuit 171, for transmitting a set of packets 140 from the output port 112, adding a MAC address for the router 110 (as the sending device), adding a MAC address for the receiving device, and coupling the packets 140 from an output packet queue 172. In a preferred embodiment, the output MAC circuit 171 receives the packets 140 as a sequence of eight-bit bytes and outputs them from the output packet queue 172 in a bit serial format.

Similar to the input packet queue 162, the output packet queue 172 includes a shift register, for receiving a set of 256 bits (that is, 64 eight-bit bytes) in parallel from the memory data register 151, and for transmitting a sequence of eight-bit bytes in serial to the output MAC circuit 171. In a preferred embodiment, the output packet queue 172 is double-buffered; that is, it includes two separate shift registers, one of which can be reading packets 140 in parallel from the memory data register 151 while the other can be writing packets 140 in serial to the output MAC circuit 171.

Similar to the input request circuit 163, the output packet queue 172 is coupled to a transmit request circuit 173, for determining that the packet 140 is ready to be transmitted (or partially ready, if more than 256 bits in length), and for signaling the memory 120 to write the packet 140 to the output packet queue 172. The transmit request circuit 173 is coupled to the memory address register 152 and to a control signal for the memory 120.

Packet Address Lookup Circuits

The input packet queue 162 is also coupled to a packet header queue 182, for isolating a packet header 141 for the packet 140 and for performing address lookup for that packet header 141. In a preferred embodiment, the packet header queue 182 receives the packet header 141 in parallel from the input packet queue 162.

The packet header queue 182 includes a shift register, for receiving a set of 256 bits (that is, 64 eight-bit bytes) in parallel from the input packet queue 162, and for coupling the packet header 141 to an address request circuit 183. In a preferred embodiment, the packet header queue 182 is double-buffered; that is, it includes two separate shift registers, one of which can be reading packet headers 141 in parallel from the input packet queue 162 while the other can be coupling packet headers 141 to the address request circuit 183.

The address request circuit 183 includes a hash circuit 184 for determining a hash address for packet lookup in the memory 120. The hash circuit 184 is coupled to the memory address register 152 for supplying a hash address to the memory 120 for performing packet lookup. The address request circuit 183 is also coupled to a control signal for the memory 120.

In a preferred embodiment, the hash circuit 184 is responsive to a (source, destination) pair in the packet header 141, such as described in detail in the following co-pending patent applications:

U.S. application Ser. No. 08/581,134, titled "Method For Traffic Management, Traffic Prioritization, Access Control, and Packet Forwarding in a Datagram Computer Network", filed Dec. 29, 1995, in the name of inventors David R. Cheriton and Andreas V. Bechtolsheim, assigned to Cisco Technology, Inc.;

U.S. application Ser. No. 08/655,429, titled "Network Flow Switching and Flow Data Export", filed May 28, 1996, in the name of inventors Darren Kerr and Barry Bruins, and assigned to Cisco Technology, Inc.; and U.S. application Ser. No. 08/771,438, titled "Network Flow Switching and Flow Data Export", filed Dec. 20, 1996, in the name of inventors Darren Kerr and Barry Bruins, assigned to Cisco Technology, Inc.;

These patent applications are collectively referred to herein as the "Netflow Switching Disclosures". Each of these applications is hereby incorporated by reference as if fully set forth herein.

The memory 120 responds to the hash address by delivering a set of packet lookup information to the memory data register 151, which is coupled to the packet header queue 182. The address request circuit 183 also includes a comparator 185 for determining which of several packet lookup responses coupled to the packet header queue 182 is associated with the actual packet header 141.

The packet header queue 182 is also coupled to the processor bus 131, for coupling packet headers 141 and packet lookup information to the processor 130 for extraordinary processing. Thus, when the router 110 is unable to process the packet 140, or processing the packet 140 requires more flexibility than available to the router 110 and the memory 120, the packet header 141 is coupled to the processor 130 for extraordinary processing.

In a preferred embodiment, such extraordinary processing can include enhanced packet forwarding and traffic management services such as access control, multicast packet processing, random early discard, and other known packet processing services.

System Operation

Figure 2:
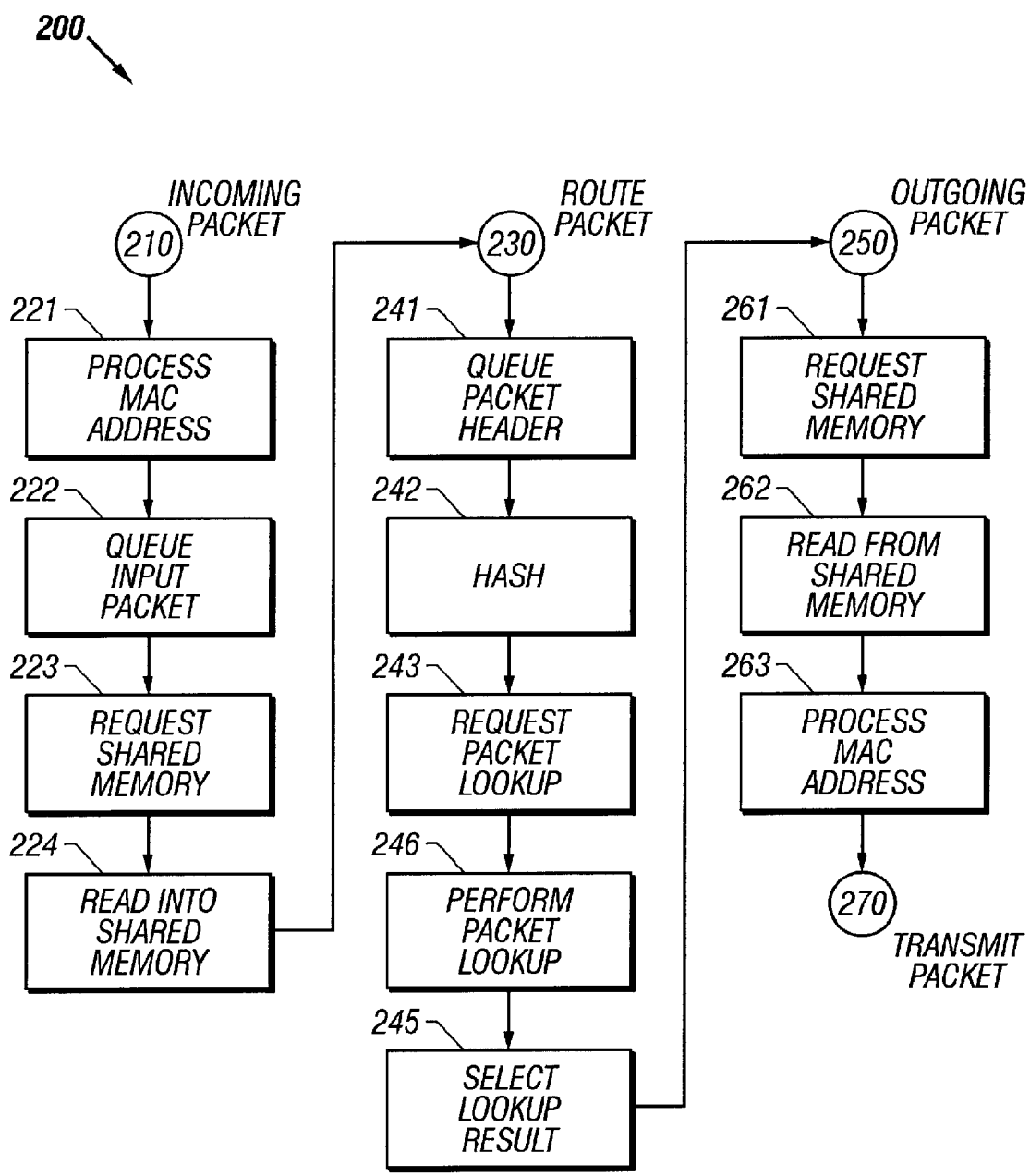
FIG. 2 shows a process flow diagram of a method for operating a system including a single-chip router.

FIG. 2 shows a process flow diagram of a method for operating a system including a single-chip router.

A method 200 includes a set of flow points to be noted, and steps to be executed, cooperatively by the system 100, including the router 110, the memory 120, and the processor 130.

At a flow point 210, an incoming packet 140 is received at one of the input ports 111.

At a step 221, the input MAC circuit 161 receives the packet 140 and both recognizes the MAC address for the sending device, and confirms that the MAC address for the receiving device is the router 110.

At a step 222, the input packet queue 162 receives the packet 140.

At a step 223, the receive request circuit 163 determines a location in the memory 120 for the packet 140, and signals the memory 120 to receive the packet 140.

At a step 224, the packet 140 is read into the shared memory 120 from the input packet queue 162.

At a flow point 230, the packet 140 is ready to be routed.

At a step 241, the packet header 141 for the packet 140 is coupled from the input packet queue 162 to the packet header queue 182.

At a step 242, the hash circuit 184 determines a hash address for the (source, destination) pair in the packet header 141, as described in the Netflow Switching Disclosures, hereby incorporated by reference.

At a step 243, the address request circuit 163 couples the packet header 141 to the memory data register 151, couples the hash address to the memory address register 152, and signals the memory 120 to perform a packet address lookup.

At a step 244, the memory 120 performs the packet address lookup and returns its packet lookup results to the memory data register 151. In a preferred embodiment, the memory 120 is disposed as a four-way set-associative memory responsive to the hash address provided by the hash circuit 184, so there are four packet lookup results.

At a step 245, the comparator 185 determines which one of the four packet lookup results is valid for the (source, destination) pair in the packet header 141, and selects that one of the four packet lookup results for packet forwarding.

At a flow point 250, the packet 140 is ready to be transmitted in response to the packet lookup results.

At a step 261, the transmit request circuit 173 determines the location in the memory 120 for the packet 140, and signals the memory 120 to transmit the packet 140.

At a step 262, the packet 140 is read from the shared memory 120 into the output packet queue 172.

At a step 263, the output MAC circuit 171 both recognizes the MAC address for the sending device the router 110 itself), adds the MAC address for the receiving device, and transmits the outgoing packet 140 on the output port 112.

At a flow point 270, an outgoing packet has been transmitted at one of the output ports 112.

The router 110 operates with regard to each packet 140 using a parallel pipeline. Thus, a first packet 140 is being received while a second packet is being transmitted while a third packet 140 is having a packet lookup performed.

The memory 120 has two regions (a packet buffer region for incoming and outgoing packets 140, and a packet header region for packet header lookup), each of which is intended to be accessed rapidly and often. However, multiple accesses to the memory 120 do not occur simultaneously; instead they are multiplexed so that accesses to these regions are each serviced often by the memory 120, and prioritized so that accesses to these regions can each be serviced rapidly by the router 110.

In a preferred embodiment, packet reception is performed with relatively high priority, packet transmission is performed with medium priority, and packet forwarding lookup is performed with relatively low priority.

Access requests by the receive request circuit 163 have the highest priority, so that when requests for such accesses are received by the memory 120, they are processed before requests for accesses by other circuits. Thus, incoming packets are entered into and retrieved from the input packet queue 162 as quickly as possible, so that queuing at the input ports 111 of the router 110 is minimized.

Access requests by the transmit request circuit 173 have medium priority (after requests by the receive request circuit 163 and before requests by the address request circuit 183), so that when requests for such accesses are received by the memory 120, they are processed after requests for accesses by the receive request circuit 163 and before requests by the address request circuit 183. Thus, outgoing packets are entered into and retrieved from the output packet queue 172 as quickly as possible after incoming packets are processed.

Access requests by the address request circuit 183 have the lowest priority, so that when requests for such accesses are received by the memory 120, they are processed after requests for access by other circuits.

ALTERNATIVE EMBODIMENTS

Although preferred embodiments are disclosed herein, many variations are possible which remain within the concept, scope, and spirit of the invention, and these variations would become clear to those skilled in the art after perusal of this application.

What is claimed is:

1. A router, including
   at least one port disposed for receiving packets;
   at least one port disposed for transmitting packets; and
      processing circuits integrated into a single monolithic integrated circuit, said processing circuits including circuits for accessing a shared memory, said circuits including
      (a) circuits disposed for copying packets between at least one region of said shared memory and said processing circuits, and
      (b) circuits disposed for performing packet lookup in at least one region of said shared memory, said packet lookup being responsive to packet headers of said packets
   wherein said circuits disposed for copying packets comprise first circuits for receiving packet information in a serial format and converting said packet information into a parallel format and second circuits for receiving said packet information in a parallel format and converting said packet information into a serial format, and
   wherein said circuits for accessing said shared memory include circuits disposed for multiplexing and prioritizing requests for copying incoming packets to said shared memory, requests for copying outgoing packets from said shared memory, and requests for performing packet lookup.

2. A router as in claim 1, wherein said at least one port disposed for receiving packets includes a plurality of ports disposed for receiving packets.

3. A router as in claim 1, wherein said at least one port disposed for transmitting packets includes a plurality of ports disposed for transmitting packets.

4. A router as in claim 1, wherein said circuits disposed for multiplexing and prioritizing assign relatively high priority to said requests for copying incoming packets to said shared memory.

5. A router as in claim 1, wherein said circuits disposed for multiplexing and prioritizing assign relatively low priority to said requests for copying outgoing packets from said shared memory.

6. A router as in claim 1, wherein said circuits disposed for multiplexing and prioritizing assign priority to said requests in a manner so as to maximize throughput and minimize routing latency.

7. Apparatus including
   a shared memory, said shared memory including packet buffers for packets and packet lookup information;

a router coupled to said shared memory, said router including processing circuits
   integrated into a single monolithic integrated circuit, said processing circuits including
   circuits for accessing said shared memory, said circuits including
      (a) circuits disposed for copying packets between at least one region of said shared memory and said processing circuits, and
      (b) circuits disposed for accessing said shared memory for performing packet lookup
   wherein said circuits disposed for copying packets comprise first circuits for receiving packet information in a serial format and converting said packet information into a parallel format and second circuits for receiving said packet information in a parallel format and converting said packet information into a serial format, and
   wherein said circuits for accessing said shared memory include circuits disposed for multiplexing and prioritizing requests for copying incoming packets to said shared memory, requests for copying outgoing packets from said shared memory, and requests for performing packet lookup.

8. Apparatus as in claim 7, including a processor coupled to said router.

9. Apparatus as in claim 7, wherein said circuits disposed for multiplexing and prioritizing assign relatively high priority to said requests for copying incoming packets to said shared memory.

10. Apparatus as in claim 7, wherein said circuits disposed for multiplexing and prioritizing assign relatively low priority to said requests for copying outgoing packets from said shared memory.

11. Apparatus as in claim 7, wherein said circuits disposed for multiplexing and prioritizing assign priority to said requests in a manner so as to maximize throughput and minimize routing latency.

12. A method, including the steps of
   receiving packets using at least one input port;
   transmitting packets using at least one output port; and
   routing said packets from said at least one input port to said at least one output port, using processing circuits integrated into a single monolithic integrated circuit,
   wherein said routing comprises multiplexing and prioritizing requests for copying incoming packets to said shared memory, requests for copying outgoing packets from said shared memory, and requests for performing packet lookup.

13. A method, including the steps of
   receiving packets using at least one input port;
   transmitting packets using at least one output port;
   copying packets between at least one region of a shared memory and a set of processing circuits integrated into a single monolithic integrated circuit; and
   performing packet lookup using said shared memory and said processing circuits, and
   wherein said steps of copying packets and performing packet lookup include the steps of multiplexing and prioritizing requests for copying incoming packets to said shared memory, requests for copying outgoing packets from said shared memory, and requests for performing packet lookup.

14. A method as in claim 13, wherein said at least one input port includes a plurality of ports disposed for receiving packets.

15. A method as in claim 13, wherein said at least one output port includes a plurality of ports disposed for transmitting packets.

16. A method as in claim 13, wherein said steps of multiplexing and prioritizng assign relatively high priority to said requests for copying incoming packets to said shared memory.

17. A method as in claim 13, wherein said steps of multiplexing and prioritizing assign relatively low priority to said requests for copying outgoing packets from said shared memory.

18. A method as in claim 13, wherein said steps of multiplexing and prioritizing assign priority to said requests in a manner so as to maximize throughput and minimize routing latency.

19. A method, including the steps of
   recording packets and packet lookup information in a shared memory;
   copying packets to and from at least one region of said shared memory;
   accessing said shared memory to perform packet lookup, using processing circuits which are integrated into a single monolithic integrated circuit, and
   wherein said steps of copying packets and accessing said shared memory include the steps of multiplexing and prioritizing requests for copying incoming packets to said shared memory, requests for copying outgoing packets from said shared memory, and requests for performing packet lookup.

20. A method as in claim 19, including coupling a processor to said processing circuits.

21. A method as in claim 19, wherein said steps of multiplexing and prioritizing assign relatively high priority to said requests for copying incoming packets to said shared memory.

22. A method as in claim 19, wherein said steps of multiplexing and prioritizing assign relatively low priority to said requests for copying outgoing packets from said shared memory.

23. A method as in claim 19, wherein said steps of multiplexing and prioritizing assign priority to said requests in a manner so as to maximize throughput and minimize routing latency.

* * * * *